Inventor:
HEINZ FLEISSNER
BY Dicker & Craig
ATTORNEYS

United States Patent Office 3,460,266
Patented Aug. 12, 1969

3,460,266
PROCESS AND APPARATUS FOR THE HEAT-TREATMENT OF MATERIALS
Heinz Fleissner, Egelsbach, near Frankfurt am Main, Germany, assignor to Vepa AG, Basel, Switzerland
Filed Mar. 2, 1967, Ser. No. 620,182
Claims priority, application Germany, Mar. 2, 1966, A 51,721
Int. Cl. F26b 3/12, 17/00
U.S. Cl. 34—26　　　　　　　　　　　　　18 Claims

ABSTRACT OF THE DISCLOSURE

The present disclosure relates to a process and apparatus for the heat-treatment of materials which are conveyed on sieve drums subjected to a suction draft, wherein the temperature of the treatment medium, for example, air, which is drawn out of each sieve drum is controlled by sensing the temperature of said treatment medium at the surface of the material being treated.

Background of the invention

The present invention relates to a process and apparatus for the heat-treatment of materials, preferably air-permeable materials, on sieve drums subjected to a suction draft. More particularly, the present invention concerns a process and apparatus wherein the material being treated is reversed when passed from one sieve drum to the next sieve drum and wherein the suction draft which is alternately effective as the material is passed from one sieve drum to the next sieve drum is divided into separate partial flows, the temperatures of said partial flows being jointly or independently controlled.

In the process and apparatus for the heat-treatment of materials, for example, textile materials, the treatment medium flow, for example, air is drawn from each sieve drum and divided into separate partial flows which are combined with the partial flows of the adjacent sieve drums, heated and/or cooled and then supplied to the material being held on the sieve drums. The apparatus for carrying out this process is provided with at least two sieve drums on which the material to be processed is held by a partial vacuum produced in the interior of the sieve drums by fans, preferably radial fan wheels which are correlated to the faces of said sieve drums. The material being treated is alternately guided over, for example, the upper portion of the surface of one sieve drum and the lower portion of the surface of the next adjacent sieve drum or visa versa, and baffle means are provided on the inside of the sieve drums and interrupt the suction draft on that portion of the sieve drum surface not in contact with the material being treated. The baffles are advantageously concentrically curved to the interior of the sieve drum surface. In this apparatus, the treatment medium which is discharged by the fans is divided and heated by heating means with temperature controls which are correlated to the two sides of the fans, for example, above and below the fans. The treatment medium discharged by the two fans of adjacent sieve drums in one direction, for example, upwards, is supplied to the sieve drum carrying the material on that side, for example, on the upper portion of the sieve drum, whereas the treatment medium discharged in the other direction, for example, downward, by two adajacent sieve drums is supplied to the sieve drum carrying the material on that side, for example, on the lower portion of the sieve drum.

The above-described sieve drums may either be arranged in one horizontal row or in one vertical row. However, apparatus are known where the sieve drums are arranged in two rows staggered to each other. In these situations, the horizontal or the vertical construction is also possible. According to the above-described air guidance system, at least two sieve drums form a unit onto which the air drawn out of the drums is blown. Such devices can be used for drying materials, preferably air-permeable materials. However, they can also be used with great success for heat-setting, setting of dyestuffs, steaming, cooling, curing and polymerizing textiles impergnated with synthetic resins and for similar heat-treatment processes. Some of the advantages of these devices are that they are sturdy, fail-safe, inexpensive and possess a high capacity construction.

In general, when using apparatus of this type, an indirect heating of the air by means of ribbed tubes containing a heating medium is preferred. As a heat transfer medium or carrier, steam, flue gases from oil or gas burning and liquid medium, for example, Dyphil, can be passed through the ribbed tubes. However, direct heating means can also be used, for example, a tubed-shaped burner can be disposed above and below the fan wheels. In this case, the material being treated is exposed to a flue gas-air mixture which for several treatments and for various textiles is desirable because of the oxygen deficiency in the treatment medium. As is well known, oxygen tends to cause a yellowing of textile fibers at elevated temperatures. When indirect heating is used, the ribbed tubes may be arranged in the fan chamber above and beneath the fan wheels. However, the ribbed tubes can also be arranged in the treatment chamber above and beneath the sieve drums. In apparatus where a very high heating capacity is required, for example, when using dryers for staple fiber, ribbed tubed heaters can be arranged above and beneath the fan wheels as well as above and beneath the sieve drums.

In all of these devices, the heaters arranged above and beneath the fan wheels and/or above and beneath the sieve drums are constructed as a unit, that is, the two heater batteries are connected with each other and are controlled by one regulating device. In general, the heating device extends over two sieve drums. However, heating devices are also known which extend over or accommodate more than two sieve drums and which are jointly controlled. Heat-treating apparatus with up to thirty sieve drums subjected to a suction draft are well known. These apparatus are, in general, subdivided into several compartments with varying treatment temperatures. In this case, one regulating device is provided for each compartment.

When heat-treating very delicate materials with the above-described apparatus, problems are encountered wherein the material to be processed tends to yellow or in the case of high-grade finishing of textiles with synthetic resins, the synthetic resins tend to brown and in some cases burn. Up to now, these undesirable results were attributed to too high treatment temperatures and there were no problems if a correspondingly lower treatment temperature were used. However, it is desirable to work with as high treatment temperatures as possible since with high temperatures the treatment time is substantially shorter and accordingly with the same apparatus a higher production can be obtained in this manner.

Up to the present time it was believed that to meet the requirements for more efficient apparatus of this kind, it was necessary to increase the quantity of air circulated and drawn through the materials. However, larger air quantities require higher fan capacities and thus larger fan wheels. The aforementioned air guidance system offers the advantage that special fan housings can be dispensed with so that substantially larger fans can be built into the system. For example, instead of radial fan wheels, axial fan wheels and cross-current blowers can be provided in the fan chamber. However, radial fan wheels are generally preferred. When fans with high capacities are used, they require correspondingly more efficient electrical drives. With a further increase of the fan capacity, for example, by increasing the speed, the output is improved. However, the energy costs, that is, the cost of current for driving the fans, substantially increase, and more rapidly than the fan capacity.

Measurements carried out on sieve drum dryers have surprisingly shown, that in spite of the same fan capacity for each sieve drum containing equivalent heating areas, when using a joint control for at least two sieve drums, varying temperatures prevail in the sieve drums. For example, the temperatures at the lower portion of the sieve drum are lower than those at the upper portion of the sieve drum. Also, measurements carried out on a plurality of dryers have shown that although the temperature differences substantially depend upon the particular heating device and the heat carrier used, there are also considerable temperature fluctuations with the same heat carrier and the same heating device. Temperature differences of about 5 to 30° C. have been observed. Accordingly, it has been determined that many problems concerning the quality of the end product are to be attributed to these temperature differences.

In an attempt to eliminate these temperature variations, heating devices with varying capacities were provided, for example, by installing a more efficient heating system below the fan wheels and/or the sieve drums. However, this measure achieved only a slight improvement in temperature uniformity because the temperature differences generally vary with the air-permeability of the material being processed. In general, the temperature differences are smaller when processing materials which are well permeable to air than with materials which are slightly permeable to air. However, temperature uniformity throughout the system also depends on the quantity of fresh air supplied to the apparatus proportional to the quantity of air enriched with moisture which is discharged from the apparatus. Furthermore, temperature differences depend largely upon the type of processing. For example, drying wet materials require conditions which are different than when setting dry materials. Again, different conditions prevail when curing synthetic resin impregnations, for example, in the manufacture of needled felt foor coverings.

One of the particular advantages of using an apparatus with sieve durms subjected to a suction draft is its versitility in treating a variety of materials, such as loose wool, rayon staple, lengths of material or silver-type goods and also piece goods, such as veneers, skins and the like. Also, the present apparatus has application in many types of treatment, such as for example, drying, curing and polymerizing synthetic resin impregnations, fiber and dyestuff fixation, shrink-proofing or conditioning and cooling, and many other textile finishing processes. Thus, it is highly desirable to achieve temperature uniformity while maintaining apparatus flexibility.

Summary of the invention

It is an object of the present invention to avoid the prior art disadvantages in heat-treatment processes and apparatus.

Another object of the present invention is to provide an apparatus with high capacity and which functions extremely economically, and which finds application in treating a variety of materials, especially very delicate materials.

A further object of the present invention is to provide an improved process and apparatus for maintaining temperature uniformity during all phases of the treatment process.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

According to the present invention it has been found that the present apparatus with sieve drums subjected to a suction draft can be effectively used for treating a variety of materials in various treatment processes by separately controlling the heating means correlated to each sieve drum, independent of each other. By the process and apparatus of the present invention it has been found effective to provide joint heater batteries for each of two sieve drums and fan wheels, and to correlate to each heater battery a regulating device which is provided with temperature sensing means or feelers, said regulating device being disposed near the material being treated on the sieve drum so that it senses the temperature of the treatment medium at the surface of the material being treated, after the treatment medium has passed the heater batteries. When using an apparatus wherein a heater battery is provided above and below each fan wheel and/or each sieve drum, the heater batteries situated at the same level of the two sieve drums may be combined as one unit and controlled jointly by one regulating device.

The control of the heating device according to the present invention can be accomplished with indirect heating as well as with direct heating. In the case of indirect heating, the heat carrier or heat exchange fluid may be liquid, gaseous or vaporous and in the case of direct heating, gas or oil heating may be used. By separately controlling the heaters correlated to the upper and lower side of the suction drum and by using an apparatus with the sieve drums arranged in one horizontal row, the aforementioned disadvantages, that is the temperature differences, can be substantially eliminated. With the various materials and processes used, only the regulating frequency changes whereby temperature fluctuations with respect to time can be limited to ±1° C. By maintaining substantially constant temperature conditions within the apparatus, not only can be material output be essentially improved but also the actual efficiency of the apparatus can be considerably increased, since now the apparatus can be operated at temperatures which are higher as a result of the heat fluctuations and/or heat differences.

If the same type of materials are used and primarily one type of processing, for example, drying, it is possible to realize effective conditions without the need for a regulating instrument by setting and controlling the heating capacity of the heater batteries by hand. It is also possible to control groups of heater batteries, that is heater batteries which are arranged one behind the other, can be controlled jointly. Furthermore, it is advantageous if a hand control is provided even when a regulating device is used because then the apparatus can be controlled manually if the regulating device should fail.

Brief description of the drawings

The present invention will become fully understood from the detailed description hereinbelow and the accompanying drawings which are given by way of illustration only and thus are not limitive of the present invention and wherein.

Description of the preferred embodiments

Figure 2:
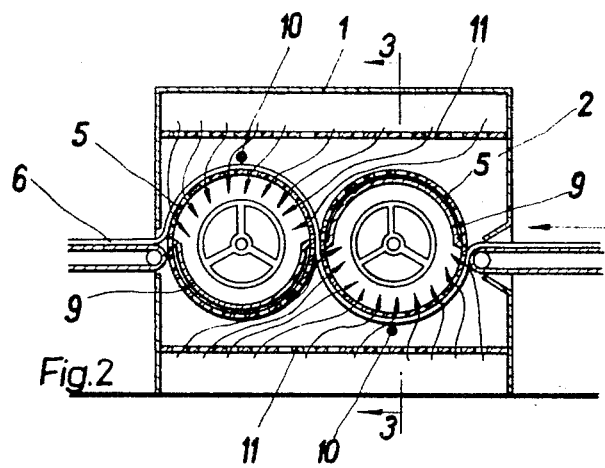
FIGURE 2 is a longitudinal section of the apparatus according to FIGURE 1.

Referring now to the drawings wherein like reference numerals are used throughout the various views to designate like parts, the apparatus of the present invention comprises a housing 1 which is subdivided into a treatment chamber 3 and a fan chamber 4 by means of a partition 2. In the treatment chamber 3 sieve drums 5 are arranged and the material being treated 6 rests on the sieve drums and is guided through the treatment chamber. In the fan chamber 4 radial fan wheels 7 are correlated to the faces of the sieve drums 5 and draw the treatment medium out of the sieve drums and produce a partial vacuum in said sieve drums, which serves to hold the material 6 to the outside surface of said drum. At the same time, the partial vacuum draws the treatment medium through the material 6 and thus an intense treatment effect is obtained. The fan wheels of the apparatus discharge the treatment medium drawn out of the drums in two different directions, for example, upward and downward, and return it to the treatment chamber 3 via heater via heater batteries 8. Since the suction draft is interrupted at the surface of the sieve drums at those portions which are not covered with material, by means of baffles 9 arranged in the sieve drums, the partial flows of the treatment medium discharged upward from the two sieve drums 5 are supplied to the sieve drum at the outlet and the partial flows of the treatment medium discharged are supplied to the sieve drum at the inlet. In FIGURE 2 only two sieve drums are shown. However, any desired number of sieve drums can be used.

Figure 1:
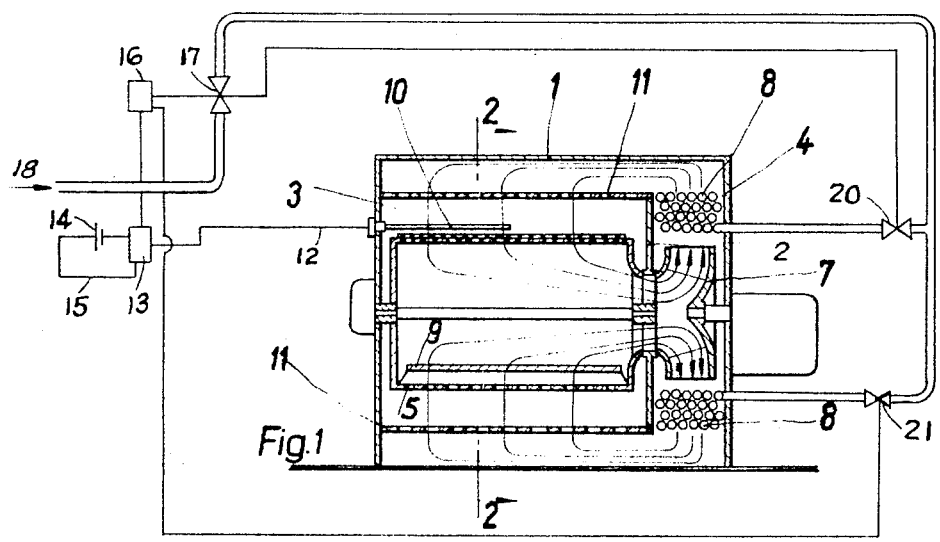
FIGURE 1 is a cross-sectional view of an apparatus with sieve drums subjected to a suction draft, according to the present invention.
Figure 3:
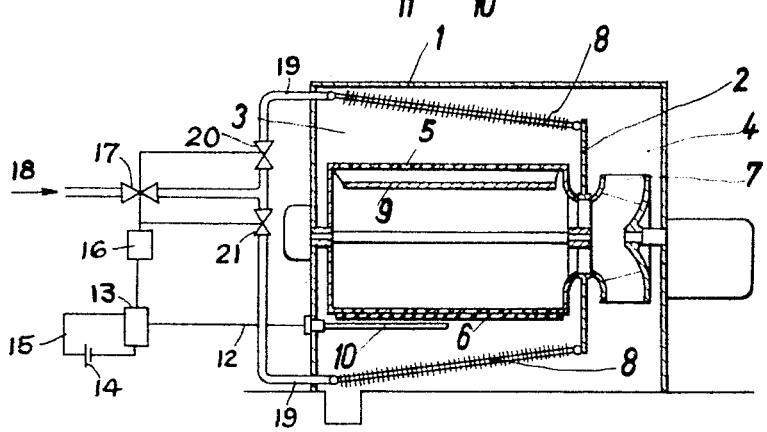
FIGURE 3 is a cross-section of a similar apparatus according to the present invention.

A temperature sensing means or feeler 10 is correlated to that portion of each sieve drums which is covered with the material being processed and is connected to a regulating means (not shown) which controls the heating capacity of correlated heater battery 8. To equalize the treatment medium flow in the embodiments according to FIGURES 1 and 2, sieve sheets 11 are provided above and below the sieve drums 5. If the heaters 8 are provided in the treatment chamber 3 as shown in FIGURE 3, such sieve sheets are generally not required. The upper and lower heater batteries 8 are also controlled separately. A separate control is also advantageous if the sieve drums are arranged vertically one above the other either in one or in several rows.

The operation of an automatic control system which can be used in the present invention functions as follows: The temperature measured by the temperature sensing means 10 within the treating chamber and in direct proximity to the material being treated is transmitted to a measuring circuit 12 and a thermoelectric element 13 which is supplied by a current source 14 in test circuit 15 to the servomotor 16 in the form of an electric impulse. The servomotor controls a valve 17 which, in turn, controls the supply of a heating medium 18, for example steam, through tubing 19 to the heating elements 8.

In manual operation, the temperature sensed by the temperature sensing means 10 is noted by an operator who can then manually operate valve 17 to control the amount of the heating medium, for example water or steam, introduced into the system. The servomotor also controls valves 20 and 21 for the selective use of either the upper or lower banks of heaters or for their combined use.

Since modifications of this invention will be apparent to those skilled in the art, it is not desired to limit the invention to the exact constitution shown and described. Accordingly, all suitable modifications and equivalents may be resorted to which fall within the scope of the appended claims.

I claim:

1. A process for the treatment of air-permeable materials which comprises continuously conveying the material to be treated on a sieve drum subjected to a suction draft through a treatment zone, said material being reversed as it is passed from one sieve drum to the next sieve drum, passing a gaseous treatment medium around and through the material being treated, dividing the treatment medium drawn out of each sieve drum into first and second partial flows, and passing the partial flows over heat-exchange means, the temperature of each of said first and second partial flows from one sieve drum being independently controlled by selectively regulating the respective heat-exchange means.

2. The process of claim 1, wherein the temperature of the respective first and second partial flows of the treatment medium discharged by one or more sieve drums and supplied to one sieve drum carrying the material to be treated are conjointly controlled.

3. The method of claim 1, wherein the temperature of the treatment medium is controlled by the temperature sensed at the surface of the material being treated.

4. The method of claim 3, wherein the temperature of the treatment medium is increased as a result of the temperature sensed at the surface of the material being treated.

5. The method of claim 3, wherein the temperature of the treatment medium is decreased as a result of the temperature sensed at the surface of the material being treated.

6. The method of claim 1, wherein the temperature of the first and second partial flows of the treatment medium supplies to one or more sieve drums are jointly controlled.

7. The method of claim 1, wherein different working temperatures prevail on the sieve drums belonging to one air circulating system.

8. The method of claim 1, wherein the temperature of the treatment medium is sensed at the surface of the material being treated and said temperature is automatically controlled depending upon said temperature sensed.

9. The method of claim 8, wherein the temperature of the treatment medium is manually controlled.

10. The method of claim 8, wherein due to the independent temperature control of the first and second partial flows, the temperature fluctuations of the treatment medium is limited to about ±1° C.

11. The method of claim 9, wherein due to the independent temperature control of the first and second partial flows, the temperature fluctuations of the treatment medium is limited to about ±1° C.

12. An apparatus for the treatment of air-permeable materials which comprises a closed housing, at least one cylindrical sieve drum rotatably disposed within said housing, the perforated cylindrical surface of said sieve drum serving as a conveying means, inlet means for introducing the material to be treated to said conveying means, vacuum means communicating with the interior of the cylindrical sieve drum for producing a vacuum therein, concentrically curved baffle means disposed on the inside of said cylindrical sieve drum and interrupting the vacuum produced by said vacuum means alternately in the upper and lower portion of adjacent sieve drums, means for dividing the treatment medium drawn from the interior of each sieve drum into first and second partial flows, means for separately heating or cooling each of said partial flows, and temperature sensing means disposed near the surface of the cylindrical sieve drum containing the material being treated for controlling the temperature of said heating or cooling means independent of each other.

13. The apparatus of claim 12, wherein the means for heating or cooling the partial flows from more than one sieve drum are jointly controlled by the temperature sensing means.

14. The apparatus of claim 12 wherein the heating or cooling means are automatically controlled by the temperature sensing means.

15. The apparatus of claim 12, wherein the heating or cooling means are manually controlled.

16. The apparatus of claim 12, wherein the heating means are provided in the fan chamber.

17. The apparatus of claim 12, wherein the heating means are provided in the treatment chamber.

18. The apparatus of claim 12, wherein the means for heating or cooling the respective first and second partial flows from more than one sieve drum are conjointly controlled by the temperature sensing means.

References Cited

UNITED STATES PATENTS

| | | | |
|---|---|---|---|
| 3,011,266 | 12/1961 | Fleissner | 34—115 XR |
| 3,140,157 | 7/1964 | Fleissner et al. | 34—115 |
| 3,196,555 | 7/1965 | Friedel et al. | 34—115 |
| 3,259,995 | 7/1966 | Powischill | 34—48 XR |

KENNETH W. SPRAGUE, Primary Examiner

U.S. Cl. X.R.

34—48, 115